United States Patent [19]
Allison

[11] 3,919,616
[45] Nov. 11, 1975

[54] CONSTANT VOLTAGE POWER SUPPLY
[75] Inventor: Joseph M. Allison, Wesleyville, Pa.
[73] Assignee: General Systems, Erie, Pa.
[22] Filed: Dec. 6, 1972
[21] Appl. No.: 312,709

[52] U.S. Cl. .................. 320/35; 320/39; 323/68; 320/31
[51] Int. Cl.² .................. H02J 7/10; G05F 1/58
[58] Field of Search ............ 320/39, 40, 31, 32, 35, 320/36; 322/28; 323/68

[56] References Cited
UNITED STATES PATENTS

| | | | |
|---|---|---|---|
| 3,535,616 | 10/1970 | Rutherford et al. | 322/28 |
| 3,538,421 | 11/1970 | Young | 322/28 |
| 3,553,565 | 1/1971 | Ebbinge et al. | 320/39 X |

Primary Examiner—J. D. Miller
Assistant Examiner—Robert J. Hickey

[57] ABSTRACT

A constant voltage, current limited power supply primarily intended for use as a single cell, nickel cadmium battery charger. The nickel cadmium cell has a temperature characteristic of approximately minus 1.1 mV/°F. The system disclosed herein also has substantially this same temperature characteristic due to taking advantage of the intrinsic temperature characteristic of a forward-biased base-emitter junction of a silicon transistor. A forward-biased base-emitter junction is used as a system voltage reference and the voltage feedback arrangement permits the output voltage to be substantially above the reference voltage without reflecting a magnified voltage characteristic at the output.

1 Claim, 4 Drawing Figures

CONSTANT VOLTAGE POWER SUPPLY

GENERAL STATEMENT OF INVENTION

A constant voltage (current limited) power supply is disclosed which is intended to be used as a single cell battery charger primarily for a nickel cadmium cell. The nickel cadmium cell has a temperature characteristic ($dV/dT$) of approximately minus 1.1 millivolt per degree Fahrenheit. The charger should also have this same characteristic. The system disclosed herein achieves the desired temperature characteristic by taking advantage of the intrinsic temperature characteristic of a forward-biased base-emitter junction of a silicon transistor. A forward-biased base-emitter junction is used as the system voltage reference and the voltage feedback arrangement permits the output voltage to be substantially above the reference voltage without reflecting a magnified $dV_{BE}/dT$ at the output. The output voltage is given by the following equation:

$$V_o = V_{BE} + kV_2$$

where $k$ is a constant less than 1, so that $$\frac{dV_o}{dT} = \frac{dV_{BE}}{dT} + \frac{kdV_2}{dT}$$

Since $k$ is less than 1, the first term predominates and the rate of change of output voltage with respect to temperature is given by:

$dV_o/dT$ is proportional to $dV_{BE}/dT$ is proportional to −1.1 millivolts per degree Fahrenheit.

The constant voltage, current limited power supply disclosed herein contains a voltage reference with which the system output voltage is compared. The difference signal produced at a comparator is amplified and applied to a series controller transistor in a manner which minimizes the error and hence tends to maintain a constant output voltage under the influence of varying load current and A.C. input voltage.

OBJECTS OF THE INVENTION

It is an object of the invention to provide a circuit for charging a battery wherein the output voltage of the circuit has substantially the same temperature characteristic as the temperature characteristic of the battery.

Another object of the invention is to provide an improved constant voltage power supply circuit.

Another object of the invention is to provide a power supply voltage, wherein the intrinsic temperature characteristic of a forward-biased base-emitter junction of an electronic valve is used as a system voltage reference to control the output voltage to have substantially the same temperature characteristic as the temperature characteristic of the battery.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
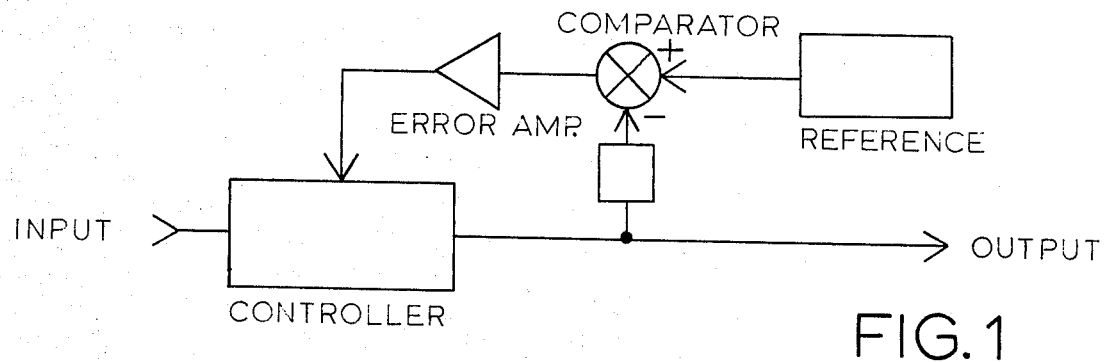
FIG. 1 is a functionally equivalent block diagram of a circuit of a conventional battery charger.

Now with more particular reference to the drawings, FIG. 1 shows a functionally equivalent block diagram of a battery charger. In the schematic diagram of FIG. 4, the controller is identified as transistor T1. The error amplifier consists of transistor stages T2, T3, T4 and T5. The reference is identified as the base-to-emitter voltage of transistor T5, that is, the so-called cut-in or barrier voltage of the base-emitter junction of transistor T5. Transistor T5 serves the multiple functions of reference, comparator, and first stage of the error amplifier. All the essential elements of a feedback control system have been identified, that is, FIG. 1 shows the reference, comparator, and first stage of the error amplifier but it does not show the function of transistor stage T7 or zener diode ZD1. Transistor T7 and zener diode ZD1, along with the associated bias elements, serve to implement a desired temperature coefficient of the output voltage. Transistor T7, resistors R11, R12, zener diode ZD1, diodes RD2, RD3, RD5, and RD6, and capacitor C2 are the temperature compensating elements. Without any constraints on temperature coefficient of output voltage, there components would be unnecessary and therefore undesirable.

The manner in which transistor T7, resistors R11, R12, zener diode ZD1, diodes RD2, RD3, RD5, and RD6, and capacitor C2 influence the temperature coefficient of the output voltage can be explained by analytically examining a hypothetical system which has these components removed but is otherwise identical to the actual system in all other characteristics. Then examine the system after inserting the transistor T7, resistors R11, R12, zener diode ZD1, diodes RD2, RD3, RD5 and RD6, and capacitor C2.

Figure 2:
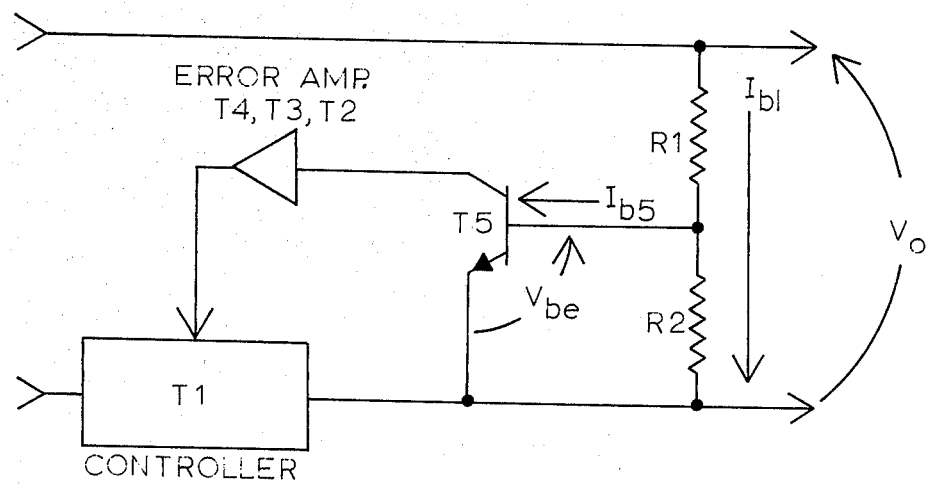
FIG. 2 shows a hypothetical circuit that has three components removed but otherwise is identical to the circuit according to the invention.
Figure 4:
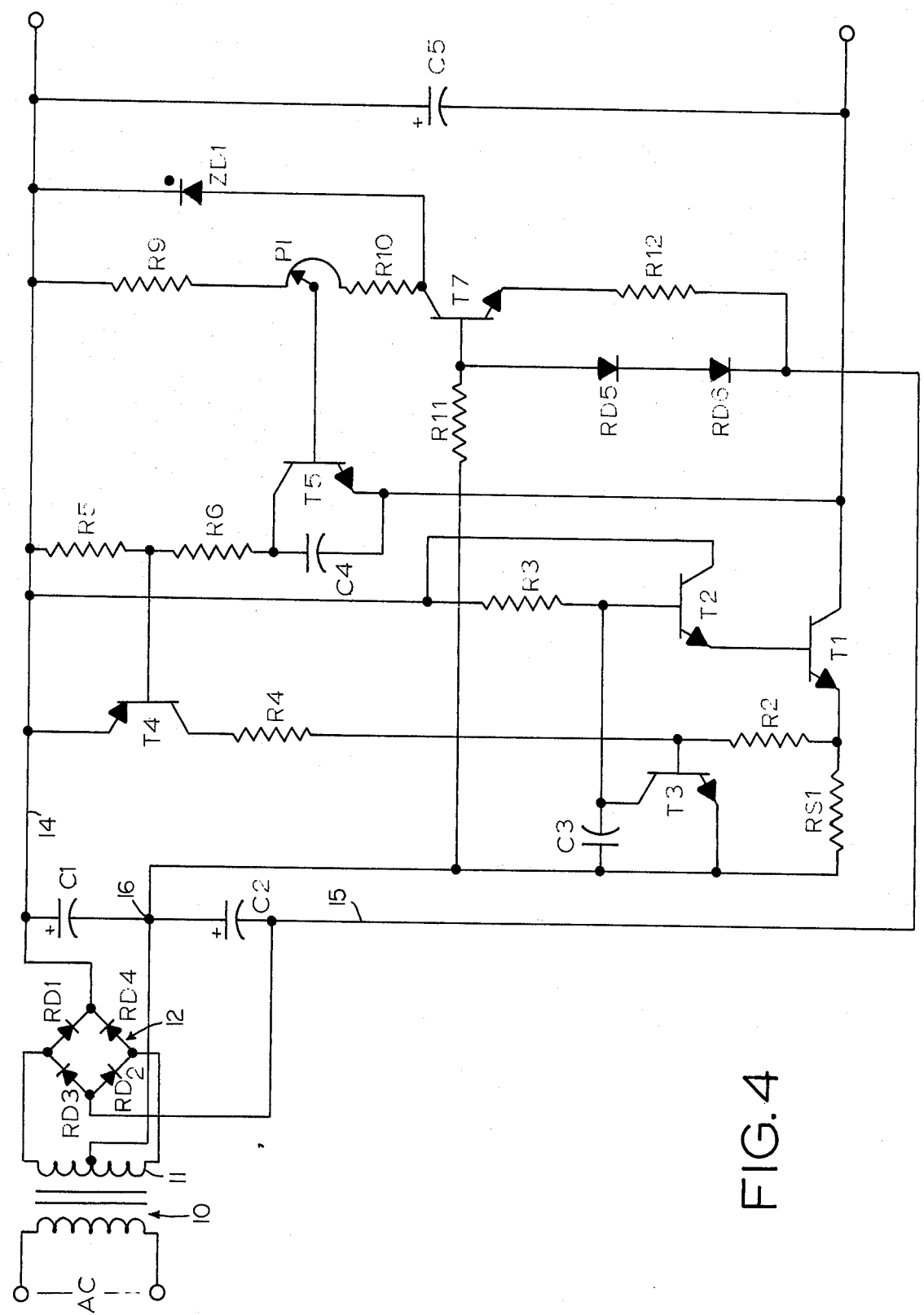
FIG. 4 shows a schematic wiring diagram of a power supply circuit according to the invention.

FIG. 2 is a hypothetical workable system identical in all respects to that shown in FIG. 4 except the above-mentioned temperature compensating elements are deleted. This hypothetical system has a temperature coefficient much different from the circuit shown in FIG. 4.

The presumption of a workable system that has this same low output impedance as the system shown in FIG. 4 requires that R1 and R2 of FIG. 2 be chosen such that the base current of T5 (IB5 in FIG. 2) is very small in comparison with the bleeder current $I_{BL}$ of FIG. 2. With this presumption, the following approximate relationship holds in the limit as the gain of the error amplifier increases without bound:

Eq. 1
$$\left(\frac{R2}{R1 + R2}\right) V_o = V_{BE}$$

$$V_o = \left(\frac{R1 + R2}{R2}\right) V_{BE}$$

The rate of change of output voltage with respect to temperature is found by differentiating the above equation for output voltage with respect to temperature. Assuming that the resistances of R1 and R2 are independent of temperature:

Eq. 2
$$\frac{dV_o}{dT} = \left(\frac{R1+R2}{R2}\right)\frac{dV_{BE}}{dT}$$

A typical output voltage in practice for the circuit is 1.5 volts at 70° Fahrenheit. $V_{BE}$ at 70° F. is about 0.58 volt for the transistor used in the circuit shown in FIG. 4. Solving the equation for the ratio, (R1 + R2/R2:

$$\frac{R1+R2}{R2} = \frac{V_o}{V_{BE}} = \frac{1.5}{0.58} = 2.6$$

Inserting this number into Eq. 2:

$$\frac{dV_o}{dT} = 2.6 \frac{dV_{BE}}{dT}$$

$dV_{BE}/dT$ is, from Ref. 1, pp 131, −2.3 millovolts per degree Centigrade = −1.28 millovolts per degree Fahrenheit at room temperature for the silicon transistor. The rate of change of output voltage with respect to temperature is therefore:

Eq. 3
$$\frac{dV_o}{dT} = 2.6(-1.28) = -3.3 \text{ mV/°F. at 70° F.}$$

Figure 3:
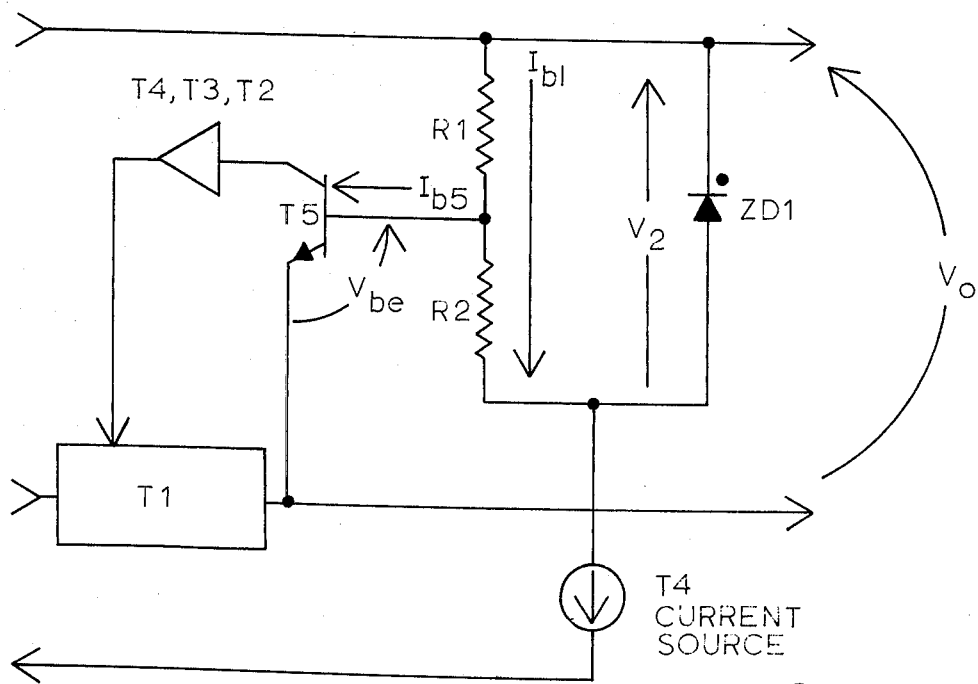
FIG. 3 shows a simplified diagram of the circuit according to the invention.

The desired temperature coefficient at room temperature is −1.1 millivolt per degree F. It will now be shown that the insertion of the missing elements results in the desired temperature characteristic. A simplified diagram of the circuit of FIG. 4 is shown in FIG. 3.

Assuming that the base current IB5 is much smaller than the bleeder current $I_{bL}$:

$$V_O = V_{BE} + I_{bL}R$$

Where the bleeder current $I_{bL}$ is constrained by the zener diode ZD1 to obey the relationship:

$$I_{bL} = \frac{V_z}{R1+R2}$$

Inserting this into the expression for output voltage:

Eq. 4
$$V_o = V_{BE} + \frac{R1}{R1+R_2}V_z$$

Taking the derivative with respect to temperature, assuming that the resistances of R1 and R2 are constant with temperature:

Eq. 5
$$\frac{dV_o}{dT} = \frac{dV_{BE}}{dT} + \frac{R1}{R1+R2}\frac{dV_z}{dT}$$

A 7.5 volt zener diode is used for ZD1 in the circuit shown in FIG. 4. Assuming an output voltage of 1.5 volt and solving Eq. 4 for the ratio $R1/(R1+R2)$:

$$\frac{R1}{R1+R2} = \frac{V_o - V_{BE}}{V_z} = \frac{1.5 - 0.58}{7.5} = 0.12$$

Substituting this number into Eq. 5:

Eq. 6
$$\frac{dV_o}{dT} = \frac{dV_{BE}}{dT} + 0.12\frac{dV_z}{dT}$$

$dV_z/dTV_z$ for the 7.5 volt zener is 0.05% per ° Centigrade at 5 milliamps of bias current (from Ref. 1, pp. 144). So that $dV_z/dT$ is +1.8 millivolts per degree Fahrenheit and $dV_{BE}/dT$ is −1.28 millivolts per degree Fahrenheit, as already mentioned in reference to FIG. 2.

Substituting these numbers into Eq. 6:

$$\frac{dV_o}{dT} = -1.28 + 0.12(1.8) = -1.1 \text{ mV/°F. at 70° F. (Q.E.D.)}$$

It has thus been shown that the power supply shown in FIG. 4 has the desired temperature coefficient of output voltage −1.1 millivolts per degree Fahrenheit at room temperature. Reference to Eq. 6 shows that this temperature characteristic is only mildly dependent on $dV_z/dI$ at the nominal output voltage of 1.5 volts.

The zener is supplied current from a source transistor stage T7. The current supplied by T7 is temperature dependent but since the zener voltage is weak function of zener voltage (see Eq. 4 with $V_O = 1.5$ and $V_z = 7.5$) the temperature dependency of the current through transistor T7 has very little influence on the temperature coefficient of output voltage. The function of T7 is to stabilize the zener bias current against unregulated supply voltage variations. It can further be stated that $dV_{BE}/dI$ is indeed a very weak function of temperature (Ref. 1, pp 131) so that $dV_o/dI$ is virtually a constant −1.1 millivolts per degree of Fahrenheit over a wide range of temperatures, which is a desirable characteristic. Experimental measurements have verified this conclusion: The temperature characteristic has been demonstrated in the laboratory to be a constant −1.1 millivolts per degree of Fahrenheit over the temperature range −20° to 85° Centigrade.

The Ref. 1 referred to above is *Electronic Devices and Circuits*, Millman and Halkias; McGraw-Hill, 1967.

In the circuit shown an A.C. line is connected to the primary winding of the transformer 10 which has a secondary winding 11 having its outer terminals connected to the full wave rectifier 12 made up of diodes RD1, RD2, RD3 and RD4. The output of the full wave rectifier 12 is connected to lines 14 and 15. Lines 14 and 15 are connected to capacitors C1 and C2 which are connected in series with each other. The junction 16 of capacitors C1 and C2 is connected to line 17 which is connected to the center tap of the secondary winding 11. Line 15 is connected to diode RD6 and to resistor RD12. Line 14 is connected to the emitter of transistor T4 to the resistor R5 and to resistor R9 and to the zener diode ZD1 and capacitor C5.

What is claimed is:

1. A power supply circuit for charging a battery having a temperature-voltage coefficient comprising
a voltage supply,
a reference means connected to said voltage supply for controlling the voltage of said supply,
said reference means having a temperature coefficient similar to the said temperature coefficient of said battery being charged,
output means connected to said voltage source, a current source connected to said reference means,
said current source being independent of the voltage of said battery being charged,
a zener diode comprising said reference,
a transistor,
said transistor having a base, an emitter, and a collector,
said base of said transistor being connected to said zener diode,
means for connecting said base emitter voltage to a battery to be charged,
said transistor and said zener being so connected that said output voltage is equal to said base emitter voltage plus a constant times said zener voltage and said constant is equal to or less than one.

* * * * *